US007530226B2

(12) United States Patent
Goodrich

(10) Patent No.: US 7,530,226 B2
(45) Date of Patent: May 12, 2009

(54) ACCESS METHOD AND APPARATUS THAT LIMIT MOTION ACCORDING TO LOAD AND POSITION

(75) Inventor: Ronald W. Goodrich, Logansport, IN (US)

(73) Assignee: The Braun Corporation, Winamac, IN (US)

( * ) Notice: Subject to any disclaimer, the term of this patent is extended or adjusted under 35 U.S.C. 154(b) by 243 days.

(21) Appl. No.: 11/569,226

(22) PCT Filed: May 20, 2005

(86) PCT No.: PCT/US2005/017837

§ 371 (c)(1), (2), (4) Date: Nov. 16, 2006

(87) PCT Pub. No.: WO2005/113999

PCT Pub. Date: Dec. 1, 2005

(65) Prior Publication Data

US 2007/0217898 A1 Sep. 20, 2007

Related U.S. Application Data

(60) Provisional application No. 60/573,614, filed on May 21, 2004.

(51) Int. Cl.

*B60P 1/00* (2006.01)
*A61G 3/00* (2006.01)

(52) U.S. Cl. ........................................ 60/468; 414/539

(58) Field of Classification Search .................. 60/468; 414/539, 546, 921

See application file for complete search history.

(56) References Cited

U.S. PATENT DOCUMENTS 5,180,275 A * 1/1993 Czech et al. ................ 414/540
2001/0036397 A1* 11/2001 Pierrou et al. .............. 414/540

* cited by examiner

*Primary Examiner*—Thomas E Lazo
(74) *Attorney, Agent, or Firm*—Michael Best & Friedrich LLP

(57) ABSTRACT

A hydraulic drive system for an access apparatus and a method of access is presented. The hydraulic drive system may include a hydraulic power unit, a hydraulic cylinder and a subsystem for limiting motion of the access system according to the position of and/or load supported by the access system. The subsystem may prevent motion, such as stowing and/or folding, when the access apparatus is supporting a load and/or is in a predetermined position. To limit motion, the subsystem may create a fluid path from the hydraulic power unit that bypasses the hydraulic cylinder, thus preventing the cylinder from moving the access apparatus. The subsystem may include a first valve that is opened when the access apparatus is in the predetermined position, and/or a second valve that is opened when the access apparatus is supporting a load.

13 Claims, 2 Drawing Sheets

ACCESS METHOD AND APPARATUS THAT LIMIT MOTION ACCORDING TO LOAD AND POSITION

REFERENCE TO RELATED APPLICATIONS

This application claims the benefit of the filing date of U.S. Provisional Patent Application No. 60/573,614, filed on May 21, 2004, which is hereby incorporated by reference.

BACKGROUND

Access systems or apparatuses such as wheelchair lifts assist mobility-challenged individuals. For example, parallelogram-type lifts may be used with vehicles in personal and public (such as, paratransit) mobility applications. Such parallelogram-type lifts may use a hydraulic system to move a transfer member, which may include a lift, between three positions including stowed (which may included folding), transfer level (such as the floor level of a vehicle or the level of other surfaces), and ground level positions. Such hydraulic systems may take advantage of gravity to lower the lift transfer member from the transfer level to the ground level. This "gravity down" or "gravity assist" feature may conserve power and reduce the wear on the components of the hydraulic system, such as the hydraulic pump and motor. The gravity down feature, which may include unfolding and lowering operations, may be controlled by throttling the hydraulic fluid flow by using, for example, flow restrictors, actuatable valves, and the like to limit free-fall of the lift and provide smooth motion of the lift transfer member, particularly when transferring a user between the transfer and ground positions. In such hydraulic systems, the motor and hydraulic pump may operate to raise the transfer member from the ground level to the transfer level, and to move the transfer member into a stowed position.

Access systems or apparatuses may include safety systems to ensure the well being of access apparatus users. The National Highway Transportation Safety Administration (NHTSA) has adopted rules mandating the implementation of safety systems, such as "interlocks." One type of interlock prevents the access apparatus from being stowed when the transfer member is occupied. To detect whether the transfer member is occupied, a safety system may include mechanical, electrical, or electromechanical sensors. An example of such a sensor includes a hydraulic pressure switch, which may be set or calibrated to detect pressures over a predetermined threshold that are indicative of a load on the transfer member. For example, the threshold may equal about 50 pounds. When the hydraulic pressure switch detects a pressure about equal to or greater than the threshold, the switch changes states to disconnect the pump motor from a power source.

The use of a hydraulic pressure switch has disadvantages. In some circumstances, such as when the motor is energized to start stowing the transfer member, the pump generally needs to run for a time period to pressurize the hydraulic system before the pressure switch can detect whether the transfer member is occupied. During this time period, however, the pump may build up sufficient pressure in the system to initiate stowing of the transfer member, even if the transfer member is occupied. Further, the access system may continue to stow the transfer member after the pump has been shut off until the hydraulic system reaches a steady state. Steady state may be reached, for example, when the pressure in the system becomes balanced with that of a load supported by the transfer member. Additionally, if the system pressure drops below the threshold when the pump is deactivated, the hydraulic pressure switch may again turn on the pump causing erratic or pulsating operation of the access system. Such operation may lead to pressure spikes, which may damage the components of the hydraulic system. Moreover, such operation may be disconcerting to an occupant of the access system, and may cause the occupant to fall from the access system.

SUMMARY

In view of the foregoing, there exists a need for a hydraulic drive system (and an access apparatus and method of access, which use the drive system) for limiting motion, such as that associated with stowing or folding an access apparatus, according to the load on and/or position of the access apparatus. The hydraulic drive system may include a hydraulic power unit, a hydraulic cylinder and a subsystem for limiting motion according to load and/or position. The hydraulic power unit supplies fluid to the hydraulic cylinder so that the hydraulic cylinder may move the access apparatus. Under certain circumstances, the subsystem creates a fluid path from the hydraulic power unit that bypasses the hydraulic cylinder, thus preventing the cylinder from moving the access system.

The subsystem may include a first valve, such as an electrically actuated valve, which opens when the access system is in a predetermined position. The first valve may be solenoid driven and in communication with a position sensor, such as a cam and microswitch arrangement, which determines the position of the access apparatus. The position sensor may open the first switch when the access apparatus is in a predetermined position. The subsystem may also include a second valve, which may be in fluid communication with the first valve. The second valve may include a limit pressure that, if exceeded, creates a fluid path that bypasses the hydraulic cylinder, thus preventing the cylinder from moving the access apparatus. The pressure limit may include a value less than the pressure required by the cylinder to move the access apparatus when the access apparatus supports a load. Additionally, or alternatively, the pressure limit may include a value greater than the pressure required by the cylinder to move the access apparatus when the access apparatus is not supporting a load, thus allowing the access apparatus to be stowed.

BRIEF DESCRIPTION OF THE DRAWINGS

The components in the following figures are not necessarily to scale, emphasis instead being placed upon illustrating the associated principles. In the figures, the same reference symbols designate the same parts, components, modules or steps, unless and to the extent indicated otherwise.

DETAILED DESCRIPTION

Figure 1:
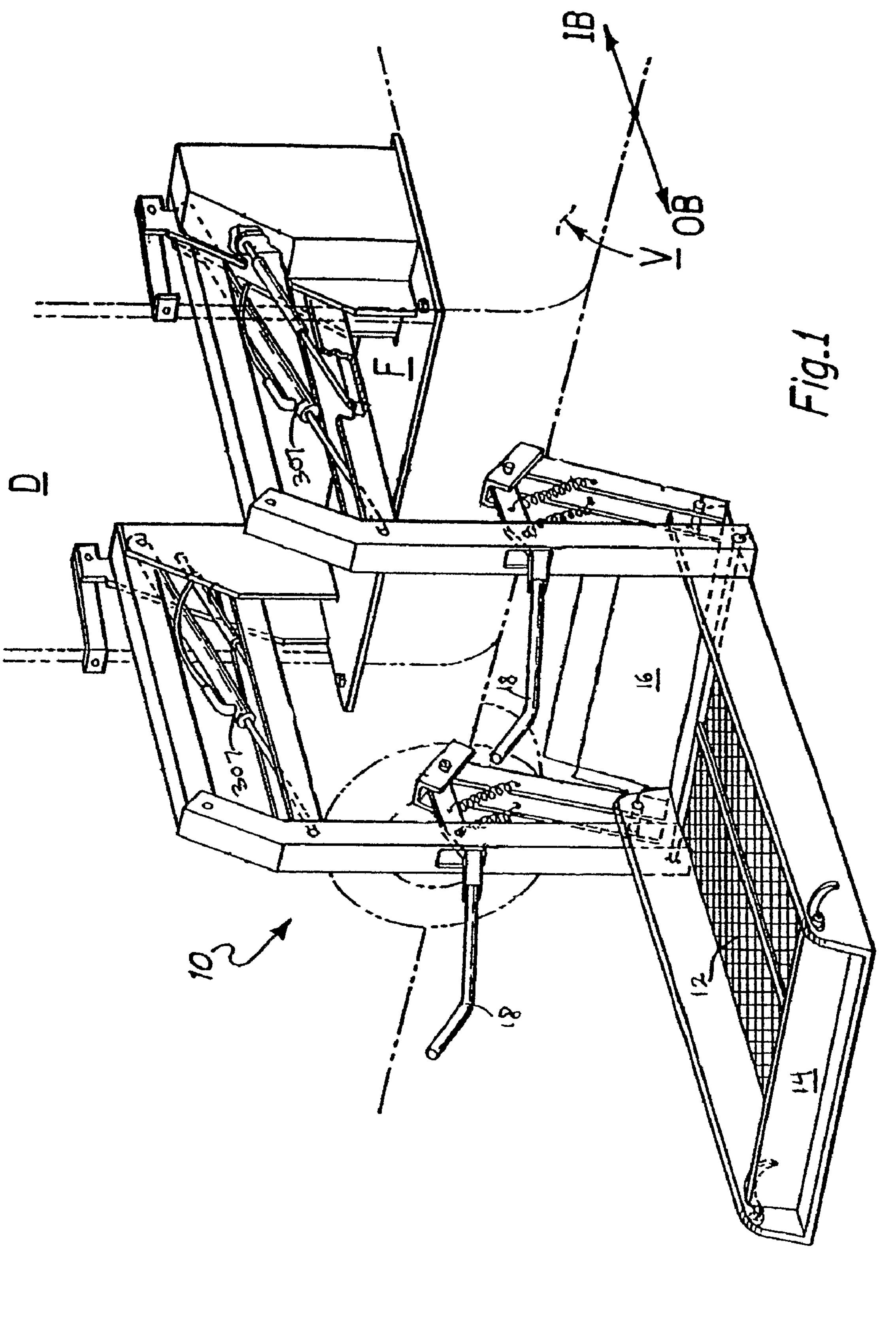
FIG. 1 is an isometric view of an access apparatus installed in a vehicle.

An exemplary access system is shown in FIG. 1. In this example, the access system 10, such as a dual parallelogram type lift, includes a transfer member 12 and is installed in a vehicle V, such as a bus, van or automobile. However, the access system 10 may be installed on or near any structure to which access is desired. Access system 10 may be installed in a doorway D and bolted or otherwise attached to a floor, such as a vehicle floor F. Access system 10 is operable to enable a mobility-challenged individual using a wheelchair, scooter, walker or other mobility assistance device to enter and exit a vehicle V or access a structure. The individual may enter the access system 10 via transfer member 12, which transfers the individual from one level ("ground level") to another level (the "transfer level" or "transfer position"), such as the level of the vehicle doorway D.

The access system 10 may include several features that enhance the safety of an individual during transfer. Exemplary safety features include one or more of the following: graspable handrails 18, an inboard barrier 16, and an outboard barrier 14. With reference to the axis shown in FIG. 1, a direction closest to or toward the transfer level, such as that of the vehicle V, shall be referred to as inboard (IB), whereas the direction away or farthest from the transfer level shall be referred to as outboard (OB). Inboard and outboard barriers 16 and 14 may include roll stops, which are operable to prevent an individual from accidentally falling off the transfer member 12 when the transfer member 12 is elevated above ground level. The barriers 14, 16 may be actuated by various apparatuses including, for example, mechanical, electrical, and electromechanical devices and/or systems. The inboard barrier 16 may be actuated by a mechanical linkage system, whereas the outboard barrier 14 may be actuated by a hydraulic cylinder (not shown). In addition, the inboard barrier 16 may serve as a "bridge plate" to allow the individual to safely enter and exit the transfer member 12 at the transfer level. Controls for the access system 10 may be located within or outside of the vehicle V or other structure and may be manipulated by a lift operator, such as the vehicle driver. Controls for the access system 10 may include switches, buttons or the like, which are operable to raise, lower, deploy, and/or stow the transfer member 12. When the doorway D is closed and the vehicle V is in motion, the access system 10 is generally stowed such that the transfer member 12 is folded and stored within vehicle doorway D. When the doorway D is unobstructed by, for example, a door or other object and the vehicle V is in a secure state, the access system 10 may be deployed and/or unfolded.

The access system 10 may include or be in communication with an electrical system (not shown). The access system 10 may be powered by a vehicle's power source, which may include a battery and alternator, a building's power supply, or other fixed or portable power supply. Alternatively, the access system 10 may include or be in communication with a dedicated power source, such as a battery. The access system 10 may include a hydraulic drive system 300, which may include a motorized pump 305 that provides fluid to lifting cylinders 307 that stow or otherwise move the access system 10. Stowing the access system 10 may include raising and/or folding the transfer member 12. The motorized pump may be linked to the power source by a switch or the like that turns the pump on and off. The electrical system may include various switches and relays for operating the access system 10 relative to state changes of the switches as the access system 10 operates. The access system 10 may include a control system, which may include a control board, logic board, or electronic controller. The electrical system may include a control panel or hand control (not shown) for actuating the access system 10 to stow, deploy, lower, raise or otherwise move the transfer member 12. The controls for stowing, deploying, lowering, raising or otherwise moving the transfer member 12 may include rocker switches, buttons, or the like, which may be manipulated by the access system operator. Additionally, the electrical system may include one or more sensors for detecting various states of the access system 10 and/or positions and/or elevation of the transfer member 12 (such as ground, transfer and other positions). Such sensors may include microswitches, Hall effect sensors, and other sensing devices and/or systems. The sensors may include a microswitch that is cam actuated when the transfer member 12 reaches the transfer level. Actuation of the microswitch may automatically switch off power to the motor to prevent damage and unnecessary wear to the access system 10 when the transfer member 12 is raised to the transfer level. In response to signals from sensors and/or controls, various elements of the access system 10 such as motors and valves may be actuated or deactuated.

Figure 2:
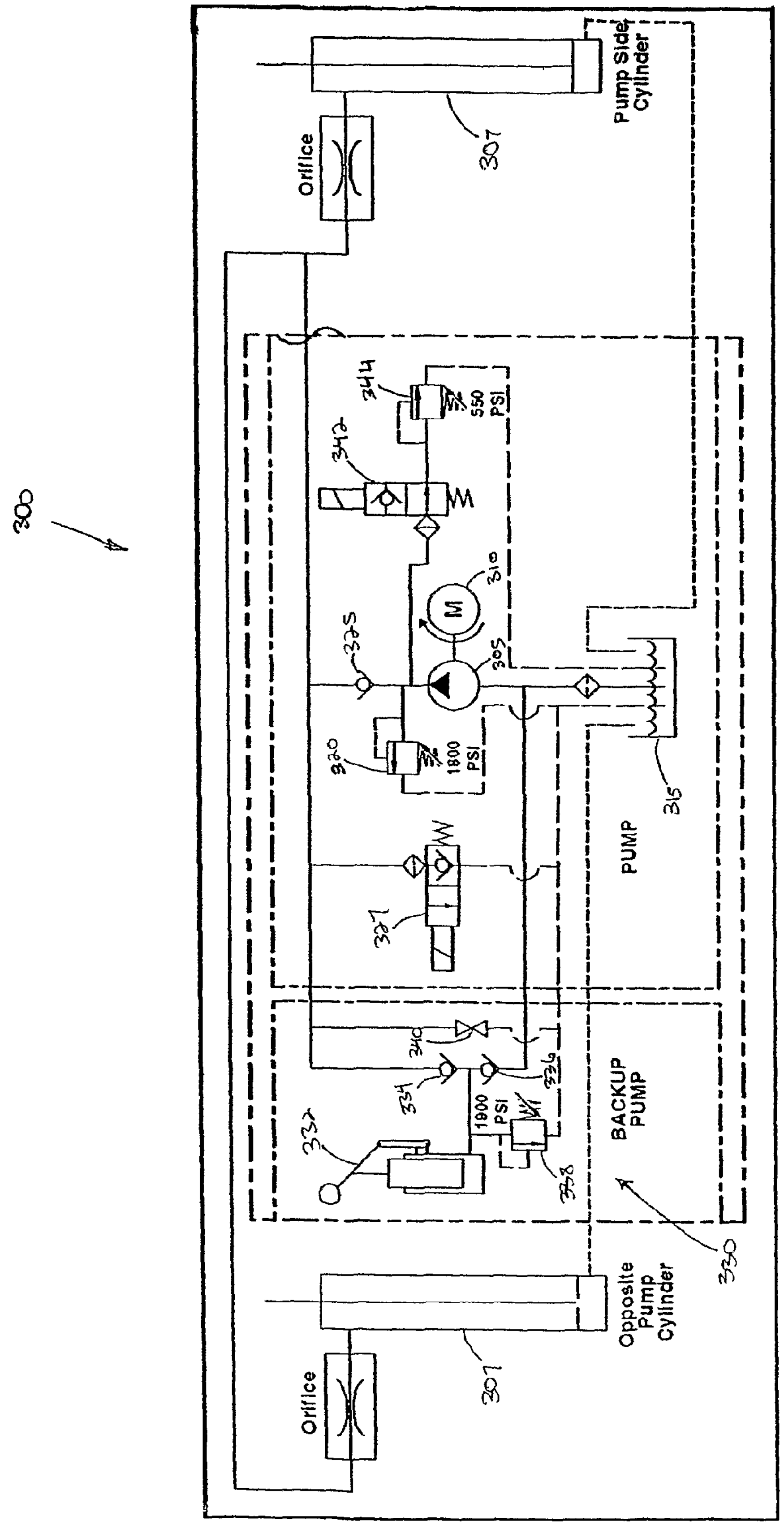
FIG. 2 is a schematic diagram of a hydraulic drive system of the access apparatus of FIG. 1.

An exemplary hydraulic drive system 300 is shown in FIG. 2, which may include a fold limiting system that inhibits stowage of the access system 10 when the transfer member 12 is occupied. The hydraulic drive system 300 may also include a pump 305 driven by an electric motor 310 to act on one or more hydraulic cylinders 307 for raising and stowing the access system 10. As shown in FIG. 1, the access system 10 may include two cylinders 307, each of which may be disposed within the access system's 10 lifting structures. As shown in FIG. 2, the pump 305 may be in communication with a reservoir 315. The pump 305, motor 310, and reservoir 315 may be integrated with other hydraulic components, such as pressure relief valves and/or directional valves in the form of a valve manifold, to form a hydraulic power unit.

The hydraulic power unit 300 may include a first pressure relief valve 320 and a check valve 325, both of which are generally related to the raising operation of the access system 10. The first pressure relief valve 320 is set or otherwise operative to limit the output pressure of the pump 305. This may prevent damage to the motor 310 and other hydraulic system components if, for example, one of the cylinders 307 or the check valve 325 binds or freezes. Towards this end, the first pressure relief valve 320 may include a limit pressure. For example, the limit pressure may equal about 1800 pounds per square inch ("psi"). Check valve 325 is operative to maintain the pressure of fluid pumped to the cylinders 307, which inhibits the transfer member 12 from lowering when the pump 305 stops (such as when the transfer member 12 reaches the transfer level). The hydraulic drive system 300 may also include a first electrically actuated valve 327 that is related to the lowering or gravity down/assist operation of the access system 10. The first electrically actuated valve 327 may include a 2 way, 2 position normally closed solenoid actuated valve that prevents hydraulic fluid from flowing into the reservoir unless a lowering operation of the transfer member 12 is activated. Upon such activation, the access system 10 energizes the down valve 327, thereby permitting fluid to flow from the rod side of the cylinders 307 through the valve 327 and to the reservoir 315, thus extending the cylinders' rods outward as the transfer member 12 lowers under gravity.

Additionally, the hydraulic drive system 300 may include a manually operated backup system 330 that facilitates use of the access system 10 without electrical power, for example, in the event of a power failure. The backup system 330 may include a manually actuated pump 332 with check valves 334, 336, a pressure relief valve 338, and a manual shutoff valve 340. The backup system 330 may facilitate lowering the transfer member 10 via gravity, and/or raising an unloaded transfer member 12 so that it may be stowed.

Furthermore, the hydraulic drive system 300 may include a fold limiting system. The fold limiting system may include a second electrically actuated valve 342 (the "electrically activated fold valve") and a second relief valve 344 (the "fold relief valve") that may be inline with the second activated valve 342. The valves 342, 344 may contribute to the folding operation of the access system 10. The access system 10, through an electrical interface, may utilize the electrically activated fold valve 342 to establish a hydraulic fluid path with the fold relief valve 344.

The electrically actuated fold valve 342 may include a 2 way, 2 position normally closed solenoid actuated valve that prevents hydraulic fluid from flowing into the reservoir unless the valve 342 is energized. The fold relief valve 344 is set or otherwise operative to limit the output pressure of the pump 305 when the electrically activated fold valve 342 is energized. The limit pressure ($P_{limit}$) of the fold relief valve 344 may include a predetermined value that is slightly greater than the pressure required to fold the transfer member 12 when the transfer member 12 is empty ("$P_{fold-empty}$"). $P_{fold-empty}$ may include a value in the range of about 400 psi to about 500 psi. Thus, when the transfer member 12 is unloaded, the pump 305 will build up pressure in the hydraulic drive system 300 until the pressure is sufficient to stow the access system 10 (in other words, the pressure reaches about $P_{fold-empty}$). Because $P_{fold-empty}$ is less than $P_{limit}$, the relief valve 344 will remain closed (for example, because $P_{fold-empty}$ cannot overcome the force of the valve's spring biased poppet) and the lift transfer member 12 will be folded. Hydraulic fluid will not be permitted to flow to reservoir 315 through valve 344, but will flow from the pump 305 to the cylinders 307 to stow the access system 10.

However, when the transfer member 12 is positioned at the transfer level, the pressure downstream of the check valve 325 is substantially lower than the pressure in the cylinders 307. Consequently, the pressure build up may not be strictly linear and the pump 305 may introduce pressure spikes in the system 300 until a steady-state pressure is achieved. Such pressure spikes may include a range from about 1700 psi to about 1900 psi, which may be sufficient to initiate stowing of the access system 10. To this end, the limit pressure $P_{limit}$ of the fold relief valve 344 is selected so that momentary spikes of pressure greater than $P_{limit}$ open fold relief valve 344 causing the fluid to bypass the cylinders 307 and go to the reservoir 315. This prevents the transfer member 12 from being stowed before a steady state pressure is achieved. The $P_{limit}$ of the fold relief valve 344 may be about 550 psi.

Further, $P_{limit}$ may be selected so that when a predetermined typical minimum load (such as an object weighing about 50 pounds) is on the transfer member 12, the access system 10 is inhibited from stowing. In this way, if the transfer member 12 is occupied by a load, such as a wheelchair and/or occupant, the pump 305 must generate a steady state pressure incrementally greater than the pressure required to fold the transfer member 12 when empty ($P_{fold-empty}$). Thus, $P_{fold-occupied}=(P_{fold-empty}+\Delta P)>>P_{limit}$ and the incremental pressure increase is bypassed to the reservoir 315 via valves 342, 344 thereby preventing the occupied transfer member 12 from tilting inwards. Because the folding pressure for stowing the occupied lift transfer member ($P_{fold-occupied}$) is greater than the limit pressure ($P_{limit}$) of relief valve 344, the valve 344 will be opened (because, for example, the folding pressure is greater than the force of the valve's spring biased poppet and forces the poppet open), thereby creating a fluid path from the pump 305 to the reservoir 315, which bypasses the cylinders 307. Thus, the fluid that is not bypassed to the reservoir 315 by valves 342, 344 will have a lower pressure than that generated by the pump 305 and will be inadequate to overcome the weight of the transfer member 12 and the load supported by the transfer member 12 so that the rods of cylinders 307 remain static and the transfer member 12 is inhibited from stowing.

Before a stowing operation is actuated (for example, by pressing a button or switch on a hand controller) and the access system 10 starts to move, the electrical system actuates the fold valve 342. When actuated, the fold valve 342 is open and fluid output by the pump 305 bypasses the cylinders 307 and goes to the reservoir 315 if the pump output pressure is greater than the limit pressure of the fold relief valve. The access system 10 may include one or more sensors and/or switches operative to sense the transfer member 12. The sensor may be operative to detect when the transfer member 12 is positioned at a predetermined level, such as the transfer level. For example, the sensor may energize the fold valve 342 when the transfer member 12 reaches the predetermined level. The sensor may include a microswitch with normally open and normally closed terminals such that the switch is cammed when the transfer member 12 is positioned at the predetermined level. Thereby, the switch simultaneously switches off power to the motor 310 and switches on power to the electrically activated fold valve 342. Thereafter, if a stowing operation is actuated and the transfer member 12 is supporting a load, the hydraulic pressure at the pump output is overcome by the load such that the transfer member 12 remains stationary.

When the access system 10 is actuated to lower the transfer member 12 from the predetermined level, the fold valve 342 and the first electrically activated valve 327 are closed to allow the fluid to drain from the lift cylinders 307. This permits the transfer member 12 to lower under gravity power. If the access system 10 is actuated to stow the transfer member 12, or if the motor 310 cannot be de-energized because, for example the hand control malfunctions, the fold-limiting system will prevent the transfer member from moving although the motor 310 and pump 305 operate normally. When the transfer member 12 reaches the predetermined level, the access system 10 may energize the fold valve 342 and the pump 305 may continue to run. However, the pump 304 will not build up sufficient pressure in the system to stow the access system 10. Thus, the fold-limiting system may provide safeguards against malfunctioning of the hydraulic and/or electrical systems.

While various embodiments of the invention have been described, it will be apparent to those of ordinary skill in the art that many more embodiments and implementations are possible within the scope of the invention. For example, the hydraulic system may include a proportional valve linked to the controller to provide real-time dynamic feedback control of the lift. Accordingly, the invention is not to be restricted except in light of the attached claims and their equivalents.

What is claimed is:

1. A hydraulic drive system for an access apparatus, comprising:

a hydraulic power unit configured to supply fluid;

a hydraulic cylinder in fluid communication with the hydraulic power unit and configured to move the access apparatus in response to the fluid; and a subsystem in fluid communication with the hydraulic power unit and configured to prevent the hydraulic power unit from moving the hydraulic cylinder when the access apparatus supports a load, the subsystem including a first valve in fluid communication with the hydraulic power unit and configured to oven when activated, and a second valve in fluid communication with the hydraulic power unit and configured to bypass the hydraulic cylinder when the access apparatus supports the load.

2. The hydraulic drive system of claim 1, wherein the subsystem includes a fluid path configured to bypass the hydraulic cylinder.

3. The hydraulic drive system of claim 1, wherein the first valve is further configured to be activated when the access apparatus is positioned at a predetermined level.

4. The hydraulic drive system of claim 1, wherein the second valve includes a limit pressure and is further configured to bypass the hydraulic cylinder when a pressure of the fluid meets or exceeds the limit pressure.

5. The hydraulic drive system of claim 1, wherein the second valve includes a limit pressure with a value lower than a pressure required by the cylinder to move the access apparatus when the access apparatus supports the load.

6. The hydraulic drive system of claim 1, wherein the second valve includes a limit pressure with a value higher than a pressure required by the cylinder to move the access apparatus when the access apparatus does not support the load.

7. The hydraulic drive system of claim 6, wherein the limit pressure is about 550 psi.

8. The hydraulic drive system of claim 6, wherein the pressure required by the cylinder to move the access apparatus when the access apparatus does not support the load is from about 400 psi to about 500 psi.

9. A hydraulic drive system for an access apparatus, comprising:

a hydraulic power unit configured to supply fluid;

a hydraulic cylinder in fluid communication with the hydraulic power unit and configured to move the access apparatus in response to the fluid; and a subsystem configured to bypass the hydraulic cylinder when the access apparatus supports a load, the subsystem comprising:

a first valve in fluid communication with the hydraulic power unit and configured to open when the access apparatus is positioned at a predetermined level; and a second valve including a limit pressure, in fluid communication with the first valve, and configured to bypass the hydraulic cylinder when a pressure of the fluid received from the first valve meets or exceeds the limit pressure.

10. A hydraulic drive system for a lift, the lift including a sensor for detecting a position of the lift, the hydraulic drive system comprising:

a hydraulic power unit; and a subsystem including a limit pressure, and configured to prevent movement of the lift according to the position of the lift, wherein the subsystem is in fluid communication with the hydraulic power unit, and in communication with the sensor, the subsystem including a first valve in fluid communication with the hydraulic power unit, the first valve configured to open according to the position of the lift.

11. The hydraulic drive system of claim 10, wherein the subsystem is further configured to prevent movement of the lift according to a load supported by the lift.

12. The hydraulic drive system of claim 10, further comprising a hydraulic cylinder and the subsystem includes a fluid path configured to bypass the hydraulic cylinder.

13. The hydraulic drive system of claim 10, wherein the subsystem includes a second valve in fluid communication with the hydraulic power unit and configured to open when the lift supports a load.

* * * * *